3,189,627
PRODUCT AND PROCESS FOR PREPARING
1,4,2-DIOXABOROLANES
Melville E. D. Hillman, Richmond, Calif., assignor to E. I. du Pont de Nemours and Company, Wilmington, Del., a corporation of Delaware
No Drawing. Filed June 4, 1962, Ser. No. 199,585
7 Claims. (Cl. 260—462)

This invention relates to chemical compounds and, more particularly, to a new class of organic boron compounds and a process for their preparation.

It is well-known that the addition of boron compounds to gasoline produces beneficial effects on engine performance including an increase in octane number. However, few boron compounds are known which are sufficiently soluble to be incorporated into gasoline and which are stable to decomposition after incorporation.

This invention provides a new class of liquid boron compounds which are soluble in organic solvents, including gasoline, and which have the property of increasing the octane number of gasoline when incorporated therein. Certain compounds of this invention are also useful as fungicides.

The compounds of the present invention are 1,4,2-dioxaborolanes of the formula:

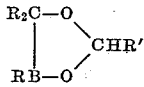

wherein R is a 1 to 12 carbon atom radical bonded to the remainder of the compound through aliphatic carbon and R' is a hydrogen, alkyl or chloro-alkyl radical of up to 12 carbon atoms. In naming the dioxaborolanes of the above formula, the ring positions are numbered clockwise beginning with the oxygen adjacent to the boron atom. The substituents in the two and three positions are preferably hydrocarbon radicals free of ethylenic unsaturation, especially alkyl radicals. The R substituents in the two and three positions can be the same or different, and include, for example, alkyl such as methyl, ethyl, propyl, isopropyl, n-butyl, secondary butyl, isobutyl, n-amyl, secondary amyl, isoamyl, n-hexyl, isohexyl, n-heptyl, n-octyl, n-nonyl, n-decyl, n-undecyl or n-dodecyl; cycloalkyl such as cyclohexyl or cyclopentyl; (cycloalkyl) alkyl such as cyclohexylmethyl or cyclohexylethyl, or aralkyl such as phenylethyl or phenylpropyl. As indicated above, R' can be hydrogen, alkyl, preferably 1 to 4 carbon alkyl, or chloroalkyl, including polychloroalkyl, e.g., di- and trichloroalkyl as well as monochloroalkyl.

The 1,4,2-dioxaborolanes of this invention are prepared by heating a borane of the formula $R_3B$ with an aldehyde of the formula

wherein R and R' have the significance noted above, with carbon monoxide at a temperature of about from 25 to 125° C. Illustrative boranes of the formula $R_3B$ which can be employed in the reaction include trimethylborane, triethylborane, tri-n-propylborane, triisopropylborane, tri-n-butylborane, tri-n-decylborane, methyldiethylborane, dimethylethylborane, diethyl-n-propylborane, diethylcyclohexylmethylborane, diethylphenylethylborane, etc. Illustrative aldehydes include formaldehyde, acetaldehyde, chloroacetaldehyde, chloral, proprionaldehyde and butyraldehyde.

Although less than a stoichiometric quantity can be employed, usually for economic reasons the quantity of aldehyde should be at least 1 mole per mole of the borane reactant. Although usually less than about 5 moles of aldehyde per mole of the borane are employed, there is no upper limit on the quantity of aldehyde used except that imposed by economics of aldehyde recovery and the space-time yield obtained in the reaction vessel.

The pressure of carbon monoxide used, that is, the reaction pressure, can vary from about 1 to about 1000 atmospheres. Higher pressures can be used but steel equipment suitable for use with higher pressures is inordinately expensive. In general, the preferred range of pressure is from about 100 atmospheres to about 900 atmospheres.

The carbon monoxide may be used alone or admixed with gases inert to the reaction such as nitrogen. Of course, the partial pressure of CO must be high enough to give a reasonable reaction rate, for example, on the order of at least one atmosphere during the entire reaction.

The temperature used in the process can range from about 25° to about 125° C. or higher. The preferred range of temperature is from about 35° to about 75° C. Below 25° C. the reaction goes at such a slow rate as to be uneconomic and above 125° C. there is danger of decomposition of the products.

The reaction can be carried out in the presence or absence of water or organic solvent. Thus, for example, the aldehyde can be anhydrous or, alternately, the aldehyde can be introduced as a hydrate or in aqueous solution. Similarly, the reaction can be carried out in the presence of organic solvents, preferably inert solvents, such as acetone, alcohol, dioxane, ether, n-pentane, benzene, toluene, xylene, or mixtures thereof.

The dioxaborolanes of the present invention are isolated by conventional techniques, generally distillation at reduced pressure. If water is present in the reaction mixture, they can be extracted with a water immiscible organic solvent such as ether, benzene or n-pentane followed by fractional distillation of the solvent and product.

The invention is further illustrated by the following examples. Parts and percentages where given are by weight.

*Example 1*

A stainless steel pressure vessel is charged with 100 parts of aqueous 37% formaldehylde and 54.6 parts of triethylborane. The vessel is pressurized with carbon monoxide to a pressure of 700 atmospheres and heated with agitation at 50° C. for 1 hour. The reaction mixture is extracted with ether, the extract dried over $MgSO_4$ and distilled to give 40.5 parts (48% yield) of 2,3,3-triethyl-1,4,2-dioxaborolane boiling at 50° at 0.2 mm.

Hydrolysis of the dioxaborolane with aqueous sodium hydroxide gives $(C_2H_5)_2CHOH$, a secondary alcohol, indicating the presence of $(C_2H_5)_2C-$ in the compound. Infrared spectra show the presence of B—O bonds and C—O bonds.

A 48% yield of 2,3,3,5,6,6-hexaethyl-2,5-diboradioxane is also obtained as a by-product in the preparation of the dioxoborolane described above.

*Example 2*

A stainless steel pressure vessel is charged with 100 parts of 37% aqueous formaldehyde and 79.0 parts of tri-isobutylborane. The vessel is pressurized with carbon monoxide to 700 atmospheres. It is then heated and agitated for one hour at 50° C. The reaction mixture is extracted with ether, the extract dried over $MgSO_4$ and distilled to give a 37% yield of 2,3,3-triisobutyl-1,4,2-dioxaborolane, a clear colorless liquid boiling at 75–85° C. at 0.65 mm. pressure.

Analysis of the liquid gives the following results:
Calculated for $C_{14}H_{29}BO_2$: C, 70.00; H, 12.17; B, 4.50. Found: C, 69.74; H, 12.28; B, 4.37.

A 60% yield of 2,3,3,5,6,6-hexa-iso-butyl-2,5-diboradioxane is also obtained from the reaction.

When the 2,3,3-triisobutyl-1,4,2-dioxoborolane described above is dissolved in fuel oil and applied to soil at a rate of 33 pounds per acre, it acts as a fungicide and prevents bacterial growth.

*Example 3*

The procedure of Example 1 is repeated using 50 parts of triethylborane and 100 parts of chloral hydrate. A 62% yield of 2,3,-triethyl-5-trichloromethyl-1,4,2-dioxaborolane boiling at 100° C. at 1.2 mm. is obtained. Elemental analysis shows the following:
Calculated for $C_9H_{16}BO_2Cl_3$: C, 39.53; H, 5.90; B, 3.96. Found: C, 39.65; H, 5.87; B, 3.81.

*Example 4*

The procedure of Example 1 is repeated using 50 parts of tri-n-butylborane and 100 parts of chloral hydrate. A 69% yield of 2,3,3-tri-n-butyl-5-trichloromethyl-1,4,2-dioxaborolane boiling at 110° C. at 0.1 mm. is obtained. Elemental analysis shows the following:
Calculated for $C_{15}H_{28}BO_2Cl_3$: C, 50.38; H, 7.8; B, 3.03. Found: C, 50.45; H, 7.88; B, 3.21.

*Example 5*

The procedure of Example 1 is repeated using 100 parts of 40% aqueous 2-chloroacetaldehyde and 50 parts of triethylborane. A 92% yield of 2,3,3-triethyl-5-chloromethyl-1,4,2-dioxaborolane boiling at 60° C. at 0.2 mm. is obtained. Elemental analysis shows the following:
Calculated for $C_9H_{18}BO_2Cl$: C, 52.85; H, 8.87; B, 5.29. Found: 52.56; H, 9.04; B, 5.04.

*Example 6*

The procedure of Example 1 is repeated using 100 parts of n-butyraldehyde and 50 parts of triethylborane. A 75% yield of 2,3,3-triethyl-5-propyl-1,4,2-dioxaborolane boiling at 55° C. at 0.5 mm. is obtained. Analysis reveals the following:
Calculated for $C_{11}H_{23}BO_2$: C, 66.69; H, 11.70; B, 5.46. Found: C, 66.36; H, 11.43; B, 5.72.

*Example 7*

The procedure of Example 1 is repeated using 100 parts of acetaldehyde and 50 parts of triethylborane. A 74% yield of 2,3,3-triethyl-5-methyl-1,4,2-dioxaborolane boiling at 35° C. at 0.25 mm. is obtained. Elemental analysis reveals the following:

Calculated for $C_9H_{19}BO_2$: C, 63.56; H, 11.26; B, 6.36. Found: C, 63.71; H, 11.24; B, 6.51.

When triethylborane is replaced by tri(phenylethyl)borane, tricyclohexylborane, or tri(cyclohexylmethyl)borane in the above procedure similar results are obtained.

The compounds and process of the invention have been demonstrated by the above examples. Many other modifications are obvious to those skilled in the art without departing from the inventive concept.

I claim:

1. A compound of the formula

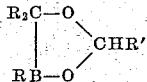

wherein R is a 1 to 12 carbon atom radical bonded to the ring through aliphatic carbon, and R' is selected from the group consisting of hydrogen, alkyl and chloralkyl radicals of up to 12 carbon atoms.

2. A compound of claim 1 wherein R is alkyl and R' is hydrogen.

3. A compound of claim 1 wherein R is alkyl and R' is trichloromethyl.

4. A compound of claim 1 wherein R is alkyl and R' is monochloromethyl.

5. A compound of claim 1 wherein R is alkyl and R' is 1 to 4 carbon atom alkyl.

6. A process for preparing 1,4,2-dioxaborolanes which comprises heating a borane of the formula $R_3B$ with an aldehyde of the formula

and carbon monoxide at a temperature of 25 to 125° C. and a carbon monoxide pressure of from about 1 to about 1000 atmospheres, R being a 1 to 12 carbon atom radical bonded to boron through aliphatic carbon, R' being selected from the group consisting of hydrogen, alkyl and chloroalkyl of up to 12 carbon atoms.

7. A process of claim 6 wherein the reaction temperature is 35 to 75° C. and the reaction pressure is about from 100 to 900 atmospheres.

References Cited by the Examiner

UNITED STATES PATENTS 3,006,961  10/61  Reppe et al. _____ 260—606.5

CHARLES B. PARKER, *Primary Examiner.*